United States Patent [19]

Mizuno et al.

[11] 4,456,814
[45] Jun. 26, 1984

[54] ARC WELDING APPARATUS INCLUDING FUNCTION GENERATORS FOR CONTROLLING WELDING PARAMETERS

[75] Inventors: Takaji Mizuno; Takao Shimizu; Yoshiaki Kato, all of Aichi, Japan

[73] Assignee: Mitsubishi Denki Kabushiki Kaisha, Tokyo, Japan

[21] Appl. No.: 457,316

[22] Filed: Jan. 11, 1983

[30] Foreign Application Priority Data

Jan. 11, 1982 [JP] Japan .................................. 57-2530

[51] Int. Cl.³ .............................................. B23K 9/10
[52] U.S. Cl. ........................... 219/137.71; 219/130.32; 219/130.5
[58] Field of Search ........... 219/130.5, 130.21, 130.31, 219/130.32, 130.33, 137 PS, 137.71

[56] References Cited

U.S. PATENT DOCUMENTS 3,483,354 12/1969 Manz et al. .................. 219/137 PS
4,162,389 7/1979 Shimdada et al. ............. 219/130.32

FOREIGN PATENT DOCUMENTS 52-58039 5/1977 Japan .............................. 219/137.71
52-69846 6/1977 Japan .............................. 219/137.71

Primary Examiner—C. C. Shaw
Attorney, Agent, or Firm—Sughrue, Mion, Zinn, MacPeak & Seas

[57] ABSTRACT

An arc welding apparatus includes means for controllingly supplying an output current to an arc-producing electrode, an output current setting unit for controlling the supplying means, means for feeding a filler wire, and means for applying voltage to the filler wire. A first function generator is connected between the output current setting unit and the feeding means for producing an output which is a function of an output current setting and which is delivered to the feeding means to control the rate at which the filler wire is fed. A second function generator is connected between the first function generator and the applying means for producing an output which is a function of the output from the first function generator and which is fed to the applying means to control the voltage applied to the filler wire. The second function generator may be connected between the output current setting unit and the applying means for issuing an output which is a function of the output current setting to the applying means to control the voltage applied to the filler wire. Therefore, the output current, the rate of feed of the filler wire, and the wire voltage can be adjusted solely by the output current setting unit.

2 Claims, 18 Drawing Figures

ARC WELDING APPARATUS INCLUDING FUNCTION GENERATORS FOR CONTROLLING WELDING PARAMETERS

BACKGROUND OF THE INVENTION

The present invention relates to an arc welding apparatus. More particularly, the invention relates to a circuit arrangement for facilitating the setting of welding conditions for a TIG (tungsten-inert gas) welding apparatus in which a filler wire is heated to a high temperature by resistance heating caused by a current flowing through the filler wire, and is fed to the weld.

FIG. 1 is a circuit block diagram showing a conventional welding apparatus of the type described. The welding apparatus includes a welding power supply 1 having output terminals to which there are connected a tungsten electrode 2 and a workpiece 3, respectively, for producing an arc 4 therebetween to melt a portion of the workpiece 3. The welding apparatus also includes a wire heating power supply 5 having output terminals, one coupled to the workpiece 3 with the other to a current feeder tip 7 for supplying an electric current to a filler wire 6. The wire heating power supply 5 supplies the current which flows through the workpiece 3, the filler wire 6, the current feeder tip 7 and back to the wire heating power supply 5, whereupon the filler wire 6 is heated to a high temperature due to resistance heating as it automatically fed into the weld puddle at the welding junction by a filler wire feeder (not shown).

A control unit for the welding apparatus of FIG. 1 is illustrated in block form in FIG. 2. Identical parts are denoted by identical reference numerals in FIGS. 1 and 2. The current flowing from the electrode 2 to the workpiece 3 is kept constant by comparing, in a comparator 9, an output from a current detector 11 with a command from an output current setting unit 8, and controlling an output regulator 10 to produce a constant current. The current which flows through the filler wire 6 is controlled by comparing, in a comparator 13, an output from a wire voltage setting unit 12 with an output from a wire voltage detector 15, and commanding an output regulator 14 for applying a constant voltage to the filler wire 6. The circuit of FIG. 2 is described in more detail in co-pending U.S. patent application Ser. No. 39,766. Some conventional apparatus put to use prior to the illustrated arrangement have no voltage feedback loop for the wire voltage as shown in FIG. 2. The filler wire 6 is fed to the weld puddle by wire drive rollers 19 driven by a motor 18 energized by a motor driver circuit 17 under the control of wire feed setting unit 16. FIG. 3 is a circuit diagram showing the filler wire feeding section having the motor driver circuit 17, the motor 8 and the rollers 19 in detail. The circuit 17 is of a well known thyristor Leonard system in which the firing angle of the thyristor is controlled by the output of the unit 16.

With the prior welding apparatus as described above, the current for melting the workpiece, the amount of feed of the filler wire for providing a desired amount of filler deposition, and the wire voltage for enabling the filler wire to be melted into the weld puddle under good conditions have independently been adjusted. It has been quite tedious and time-consuming to effect independent adjustment of these three conditions for optimum welding conditions, and it has required accumulated experience and much skill on the part of the operator.

SUMMARY OF THE INVENTION

Accordingly, it is an object of the present invention to provide an arc welding apparatus having a single setting unit for selecting optimum welding conditions.

Another object of the present invention is to provide an arc welding apparatus capable of being adjusted for the best welding conditions without having to rely on the operator's experience and dexterity.

According to the present invention, an arc welding apparatus includes means for controllingly supplying an output current to an arc-producing electrode, an output current setting unit for controlling the supplying means, means for feeding a filler wire, and means for applying a voltage to the filler wire. A first function generator is connected between the output current setting unit and the feeding means for producing an output which is a function of an output current setting, and which is delivered to the feeding means to control the rate at which the filler wire is fed. A second function generator is connected between the first function generator and the applying means for producing an output which is a function of the output from the first function generator and which is fed to the applying means to control the voltage applied to the filler wire. The second function generator may be connected between the output current setting unit and the applying means for issuing an output which is a function of the output current setting to the applying means to control the voltage applied to the filler wire. Therefore, the output current, the rate of feed of the filler wire, and the wire voltage can be adjusted solely by the output current setting unit.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 4:
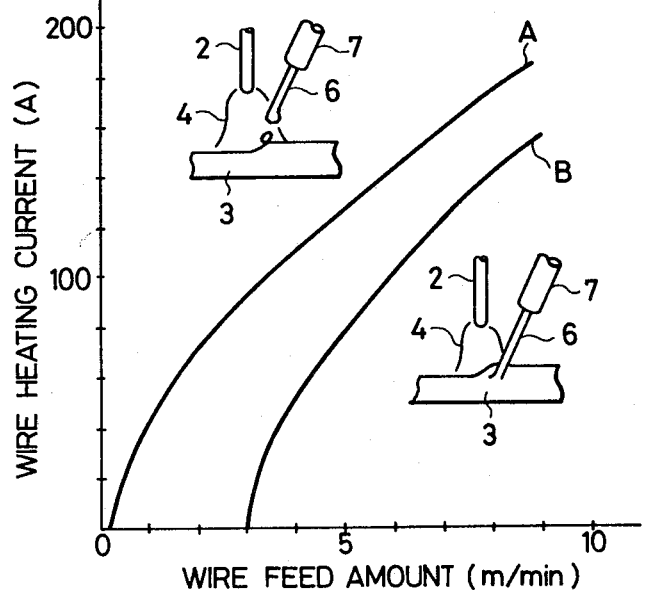
FIG. 4 is a graphical representation showing the relationship between the amount of feed of a filler wire and the current for heating the filler wire.

FIG. 4 illustrates the experimentally determined relationship between the current for heating the filler wire 6 and the amount of feed (speed of feed) of the filler wire 6. In the region above curve A, the filler wire 6 would be excessively melted into droplets which fall down in arc 4. Below curve B, the filler wire 6 would have an unmelted portion which would contact an unmelted portion of workpiece 3, resulting in poor welding. For a satisfactory welding operation, the wire heating current and the amount of feed of the filler wire should be correlated within the region defined between the curves A and B.

Figure 5:
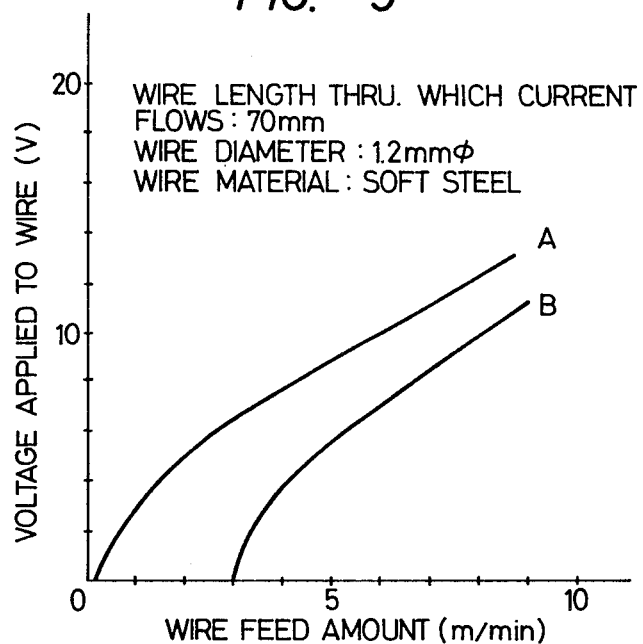
FIG. 5 is a graphical representation showing the relationship between the amount of feed of a filler wire and the voltage applied to the filler wire.

In FIG. 5, the current for heating the filler wire 6 in FIG. 4 is converted into a voltage applied to the filler wire 6, the curves A and B remaining the same in their definition. Current- and voltage-controlled wire heating modes are substantially the same, the only difference being that one mode can regain the region between the curves A and B more easily than the other after having entered the region above the curve A. The amount of heating of the filler wire 6 per unit length thereof is determined according to the relationship shown in FIG. 5.

Figure 6:
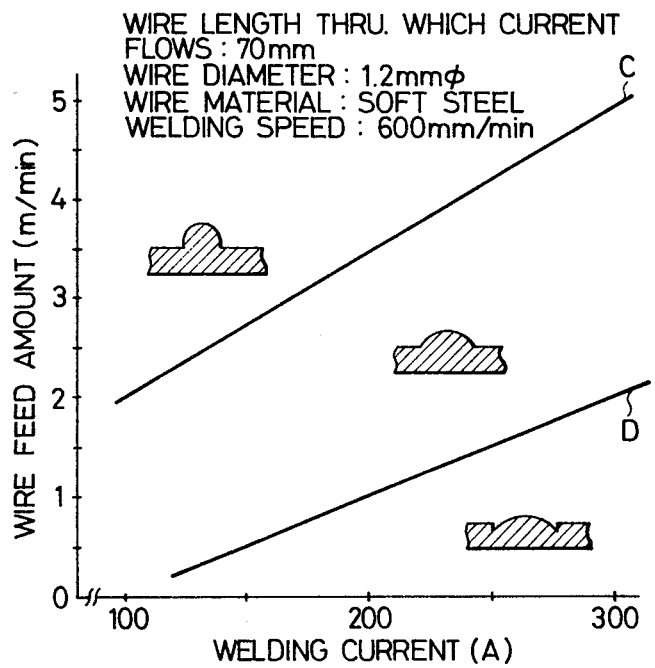
FIG. 6 is a graphical representation showing the relationship between the welding current and the amount of feed of a filler wire.

FIG. 6 is illustrative of the relationship between the welding current and the amount of feed of the filler wire 6, with welding being performed at a constant speed and the relationship between the wire feed and the wire voltage being in the region between the curves A and B of FIG. 5. If the filler wire 6 were fed at a rate above curve C in FIG. 6, then raised beads would result as more filler wire would be fed than the workpiece would be melted. If the filler wire 6 were fed at a rate below curve D, then undercuts would be formed when welded at a predetermined speed as the filler wire would be fed at a less than normal rate. Good welding can generally be effected in the region between the curves C and D. The amount of weld of the filler wire 6 per unit length thereof is determined according to the relationship shown in FIG. 6. Combination of the desired regions of FIGS. 5 and 6 therefore reduces the conventional requirement for much experience on the part of the operator in adjusting welding conditions.

Figure 1:
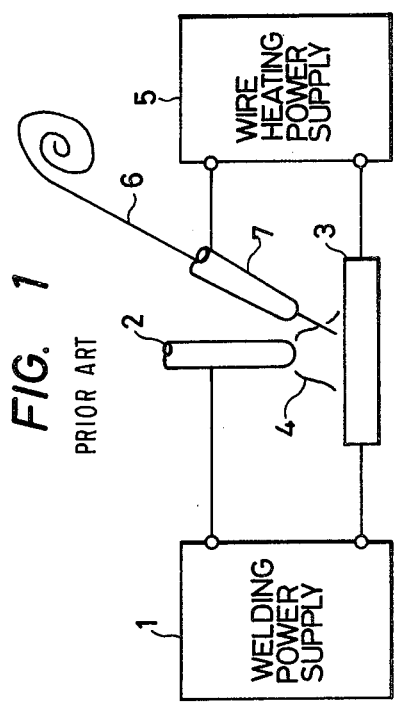
FIG. 1 is a diagram illustrative of the principles of TIG welding.
Figure 2:
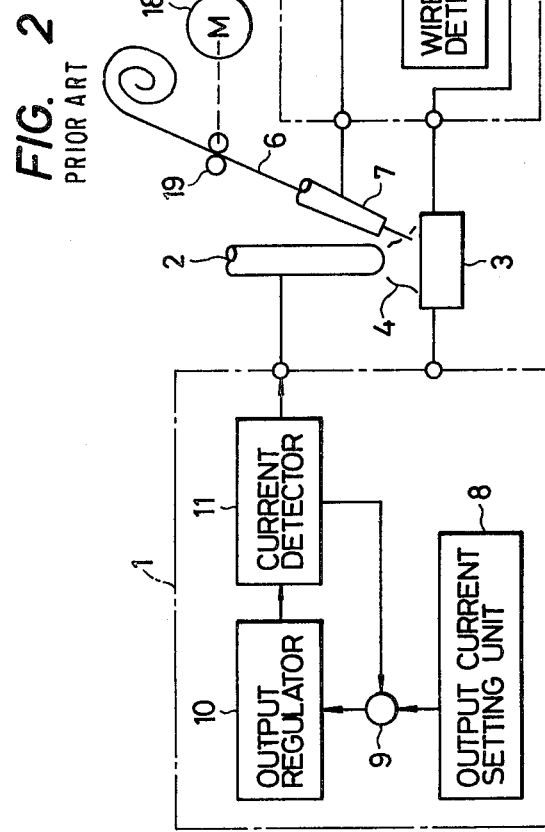
FIG. 2 is a block diagram of a conventional TIG welding apparatus.
Figure 3:
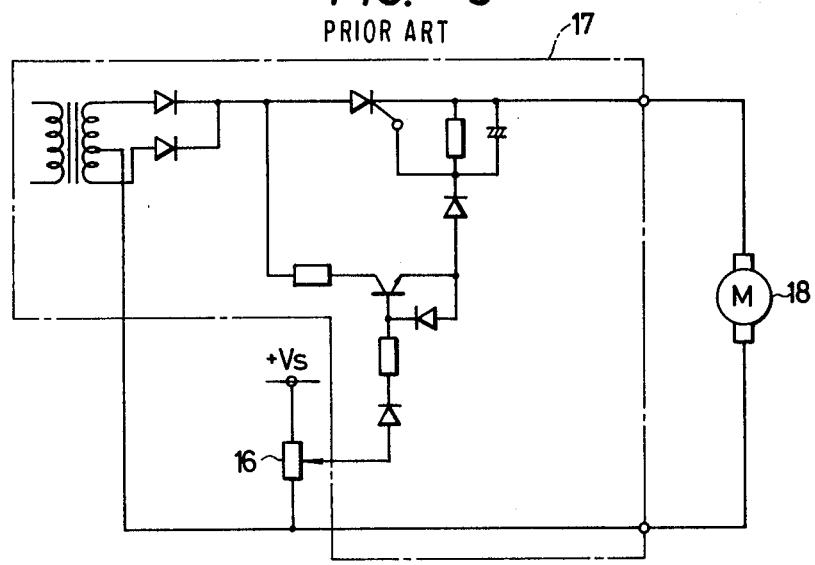
FIG. 3 is a circuit diagram showing a filler wire feeding section.
Figure 7:
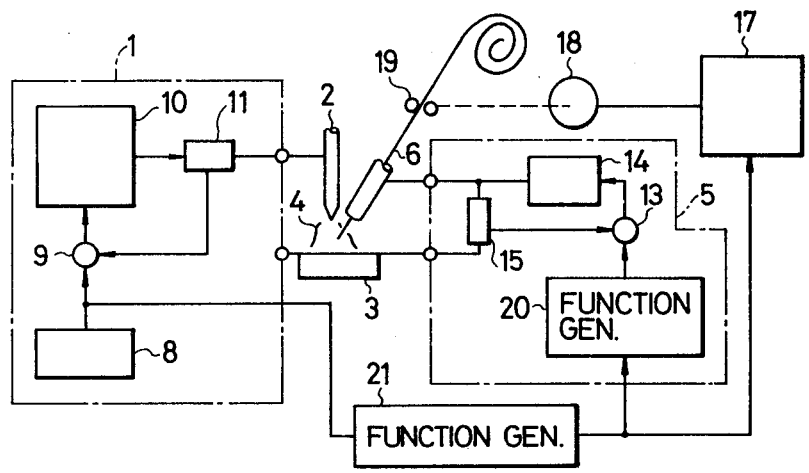
FIG. 7 is a block diagram of an arc welding apparatus according to an embodiment of the present invention.

FIG. 7 shows, in block form, an arc welding apparatus according to the present invention. Identical parts shown in FIG. 7 are denoted by identical reference numerals in FIG. 2. The arc welding apparatus of FIG. 7 differs from the welding apparatus illustrated in FIG. 2 in that the output from the output current setting unit 8 is delivered to a function generator 21, which produces an output to control the motor drive circuit 17 to feed the filler wire 6 at a desired rate. The input and output of the function generator 21 are correlated such that they fall in the region between the curves C and D of FIG. 6. The output from the function generator 21 is also led to another function generator 20, which produces an output for determining the voltage setting for the filler wire 6. The input and output of the function generator 20 are correlated so as to be in the region between the curves A and B of FIG. 5.

An example for correlating the input and output of the function generator 21 will be described under the assumption that the relationship between the wire feed amount and the welding current is determined to meet that indicated by a line bi-secting the region between the curves C and D of FIG. 6, the line being shown by a solid line in FIG. 8.

Figure 9:
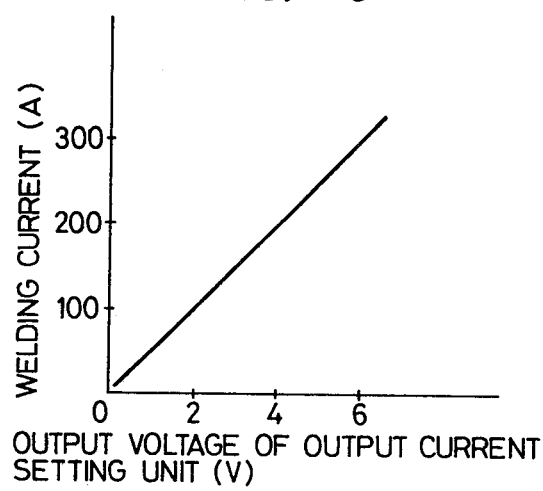
FIG. 9 is a graphical representation showing the relationship between the output voltage of an output current setting unit and the welding current.
Figure 10:
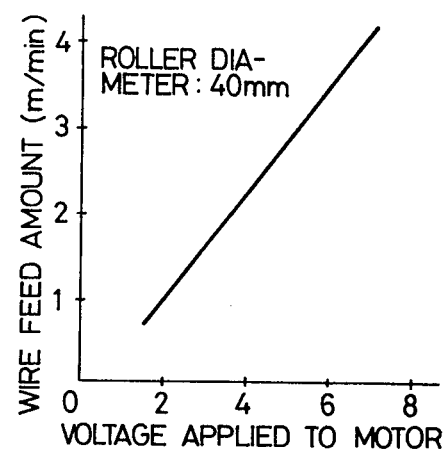
FIG. 10 is a graphical representation showing the relationship between the voltage applied to a motor and the amount of feed of a filler wire.
Figure 11:
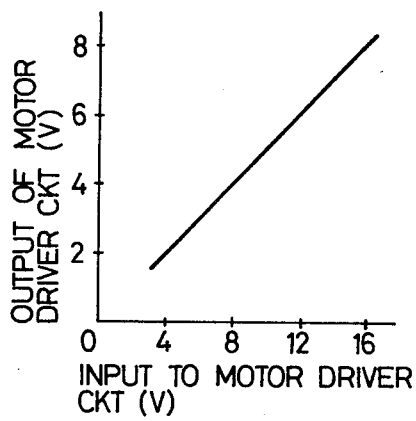
FIG. 11 is a graphical representation showing the relationship between an input voltage to a motor drive circuit and an output voltage thereof.

(1) The relationship between the output of the output current setting unit 8 and the welding current is determined as shown in FIG. 9;

(2) The characteristic curve of the motor 18 which represents the relationship between the voltage applied to the motor and the rotation speed thereof, is obtained;

(3) The relationship between the voltage applied to the motor and the wire feed amount is determined in accordance with the thus obtained characteristic curve and the diameter of the rollers 19 as shown in FIG. 10;

(4) The relationship between the input and output of the motor driver circuit 17 is then determined as shown in FIG. 11; and (5) The relationship between the input and output of the function generator 21 is thus obtained with reference to FIGS. 8 to 11.

Figure 8:
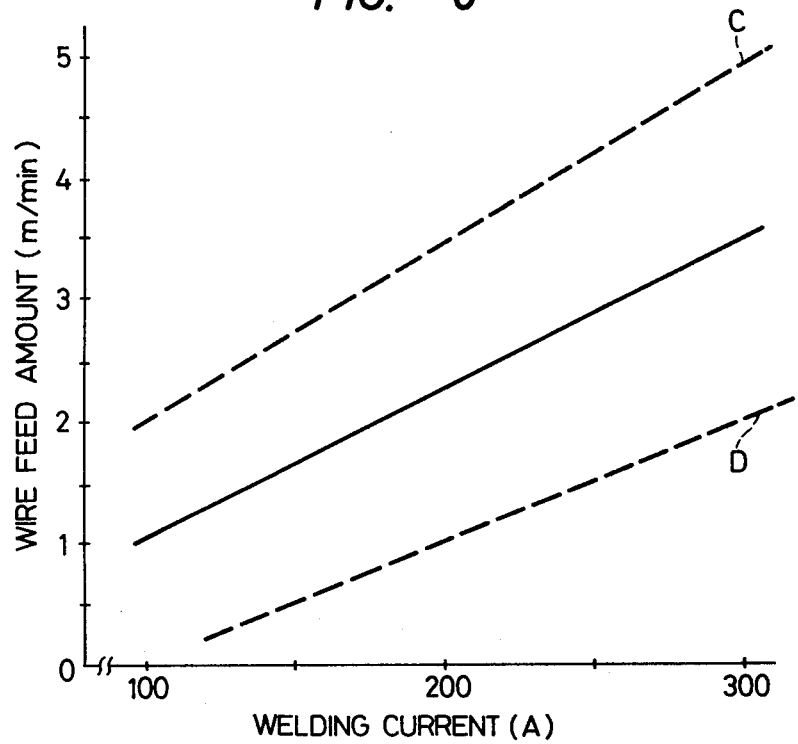
FIG. 8 is a graphical representation showing the relationship between the welding current and the amount of feed of a filler wire.
Figure 12:
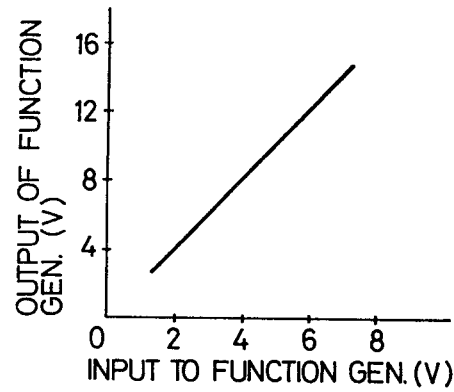
FIG. 12 is a graphical representation showing the relationship between an input voltage of a function generator 21 and an output voltage thereof.

More specifically, the solid line of FIG. 8 indicates that the wire feed amount is 3.5 m/min when the welding current is 300 A. As shown in FIG. 9, the output voltage of the output current setting unit 8 is 6 V when the welding current is 300 A. The output voltage of 6 V is applied to the function generator 21. On the other hand, FIG. 10 indicates that the voltage applied to the motor is 6 V when the wire feed amount is 3.5 m/min. An input voltage of 12 V to the motor driver circuit 17 is required to produce such a voltage of 6 V as shown in FIG. 11. Therefore, it is necessary to provide a function generator 21 adapted to produce an output voltage of 12 V when an input signal of 6 V is applied thereto. FIG. 12 is a graphical representation showing the relationship between the input and output of the function generator 21, which is obtained by plotting points as described above.

An example for correlating the input and output of the function generator 20 will now be described under the assumption that the relationship between the wire feed amount and the voltage applied to the filler wire is determined to meet that indicated by a solid line in the region between the curves A and B of FIG. 5.

Figure 13:
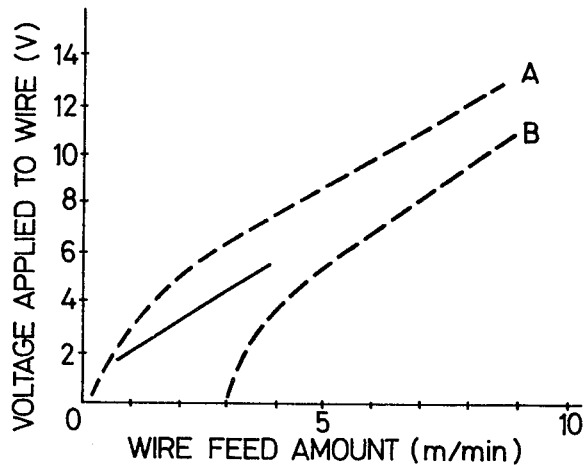
FIG. 13 is a graphical representation showing the relationship between the amount of feed of a filler wire and a voltage applied to the filler wire.
Figure 14:
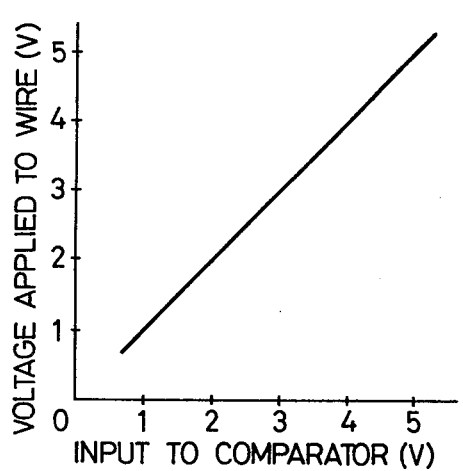
FIG. 14 is a graphical representation showing the relationship between an input to a comparator 13 and a voltage applied to a filler wire.

(1) The relationship between the input to the comparator 13, i.e., the output of the function generator 20, and a voltage applied to the filler wire is determined as shown in FIG. 14; and (2) The relationship between the input and output of the function generator 20 is obtained with reference to FIGS. 10 to 14 in the same manner as described above.

Figure 18:
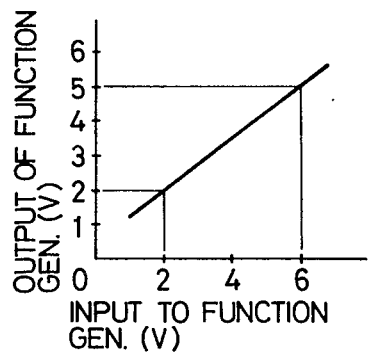
FIG. 18 is a graphical representation showing the relationship between an input of a function generator 22 and an output thereof.

More specifically, with reference to FIG. 13, when the wire feed amount is 3.5 m/min, the voltage applied to the filler wire is 5 V. Further, referring to FIGS. 10 to 12, with the wire feed amount being 3.5 m/min, an output of the function generator 21 is 12 V. This output of 12 V is applied to the function generator 20. In this case, as shown in FIG. 14, an input to the comparator 13, i.e., the output of the function generator 20, is required to be 5 V so that the voltage applied to the filler wire is set to 5 V. FIG. 18 is a graphical representation showing the relationship between the input and output of the function generator 20, which is obtained by plotting points as described above.

Figure 15:
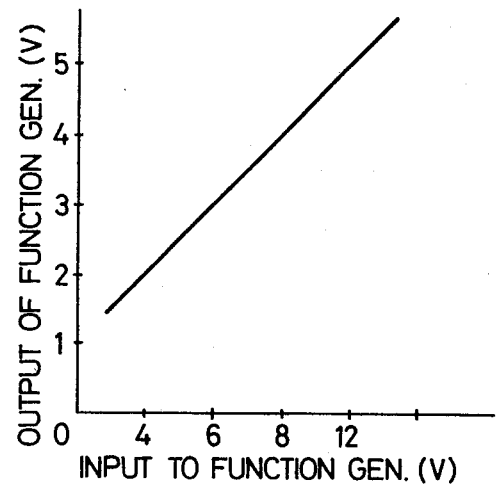
FIG. 15 is a graphical representation showing the relationship between an input of a function generator 20 and an output thereof.
Figure 16:
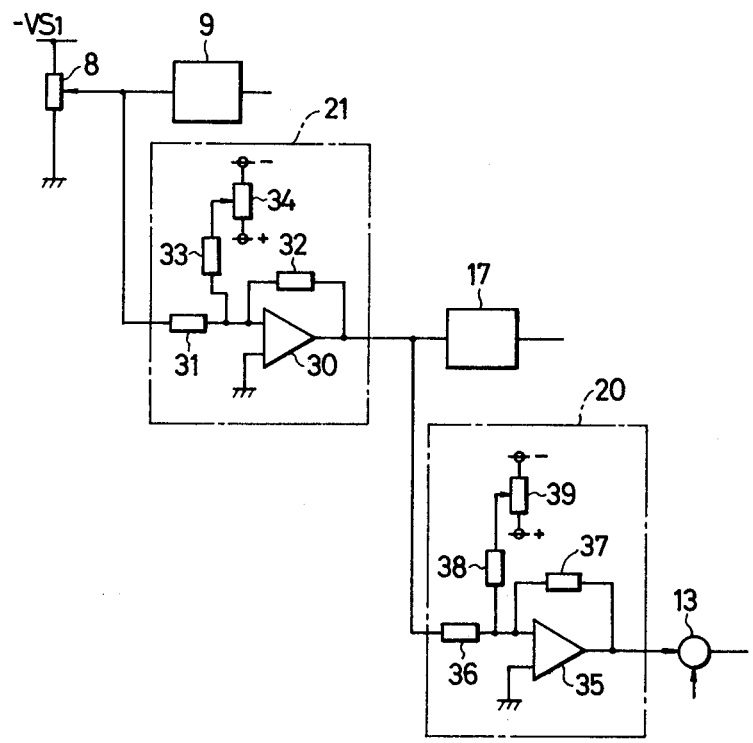
FIG. 16 is a detailed circuit diagram showing function generators 20 and 21.

FIG. 16 is a circuit diagram showing the function generators 20 and 21, each having the above described function, in detail. In FIG. 16, reference numeral 30 designates an inversion amplifier whose amplification factor is determined according to the ratio of resistances of resistors 31 and 32. By varying the amplification factor, the inclination of the characteristic curve of FIG. 12 is determined, and then a biasing is applied by resistors 33 and 34 to shift the characteristic curve to a desired position. Further, in FIG. 16, reference numeral 35 designates an inversion amplifier whose amplification factor is determined according to the ratio of resistances of resistors 36 and 37. The inclination of the characteristic curve of FIG. 15 is determined by varying the amplification factor of the amplifier 35. Biasing is applied by resistors 38 and 39 to shift the characteristic curve to a desired position.

The welding apparatus of FIG. 7 thus includes means for automatically selecting the rate of feed of the filler wire 6 for the welding current, and also for automatically selecting the voltage applied to the filler wire 6 for the selected rate of feed of the filler wire 6.

Figure 17:
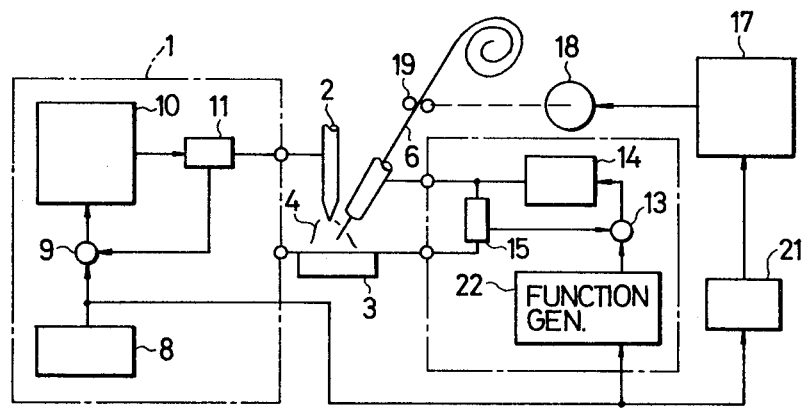
FIG. 17 is a block diagram showing an arc welding apparatus according to another embodiment of the present invention.

FIG. 17 shows an arc welding apparatus according to another embodiment in which the rate of feed of the filler wire 6 and the wire voltage are automatically selected for the desired welding current. In FIG. 17, the output from the output current setting unit 8 is fed to both the function generators 21 and 22 for determining the rate of feed of the filler wire 6 and the voltage applied thereto in response to the welding current. The function generator 22 in FIG. 17 is adapted to have a relationship between the input and output thereof so that the relationship between the wire feed amount and the voltage applied to the filler wire falls in the region between the curves A and B in FIG. 5. The input and output relationship of the function generator 22 is as shown in FIG. 18. The function generator 22 is similar to the other function generators 20 and 21 in circuit construction.

Although certain preferred embodiments have been shown and described, it should be understood that many changes and modifications may be made therein without departing from the scope of the appended claims.

What is claimed is:

1. An arc welding apparatus, comprising:
an electrode,
an output current setting unit for producing an output current setting,
means responsive to said output current setting for controllingly supplying an output current to said electrode to create an arc between said electrode and a workpiece,
means for feeding a filler wire at a controllable feed rate into said arc to weld the workpiece,
a first function generator connected between said output current setting unit and said feeding means and responsive to said output current setting for issuing an output, which is a function of said output current setting, to said feeding means to control said feed rate,
means for applying a voltage to said filler wire with respect to the workpiece, and
a second function generator connected between said first function generator and said voltage applying means and responsive to said output from said first function generator for issuing an output, which is a function of said output from said first function generator, to said voltage means to control said voltage, whereby said output current, said feed rate of the filler wire, and said voltage applied to the filler wire are adjusted in a mutually functional relationship solely by said output current setting unit.

2. An arc welding apparatus comprising:
an electrode,
an output current setting unit for producing an output current setting;
means responsive to said output current to said electrode to create an arc between said electrode and a workpiece,
means for feeding a filler wire at a controllable feed rate into said arc to weld the workpiece,
a first function generator connected between said output current setting unit and said feeding means and responsive to said output current setting for issuing an output, which is a function of said output current setting, to said feeding means to control said feed rate,
means for applying a voltage to said filler wire with respect to the workpiece, and
a second function generator connected between said output current setting unit and said voltage applying means and responsive to said output current setting for issuing an output, which is a function of said output current setting, to said voltage applying means to control said voltage, whereby said output current, said feed rate of the filler wire, and said voltage applied to the filler wire are adjusted in a mutually functional relationship solely by said output current setting unit.

* * * * *